Oct. 1, 1963

A. E. SMOLL 3,105,601

CONVEYOR CONTROL SYSTEM

Filed March 24, 1958

INVENTOR
ALLEN E. SMOLL

BY John C. Black

ATTORNEY

INVENTOR
ALLEN E. SMOLL
BY John C. Black
ATTORNEY

United States Patent Office 3,105,601
Patented Oct. 1, 1963

3,105,601
CONVEYOR CONTROL SYSTEM
Allen E. Smoll, Arlington, Mass., assignor to Stewart-Warner Corporation, Chicago, Ill., a corporation of Virginia
Filed Mar. 24, 1958, Ser. No. 723,601
3 Claims. (Cl. 214—11)

This invention relates in general to conveyor systems and more particularly to an improved semi-automatic control system therefor.

This application is a continuation-in-part of U.S. application Serial No. 677,270, filed August 9, 1957, for Conveyor Control Systems, and now abandoned.

Conveyor control systems in the past have been generally of two types: (1) those in which the controlling apparatus is placed on conveyor load transporting carriers and at conveyor stations along the path of the carriers; and (2) those in which the control apparatus is physically disassociated from the carriers and stations.

In the latter type system, it has been common to design an electromechanical analog of the conveyor system. More particularly, certain of the control system components are rotatably mounted for movement in synchronism with the conveyor carriers and certain of the control system components are permanently disposed around the moving components and have control access to the moving components. The moving components correspond to respective carriers and store destination indicating information or, as it is commonly called, "routing information." The stationary components, corresponding to conveyor load and discharge stations, are disposed around the moving components in the same order as their respective stations are disposed around the carrier path. A typical control system of this type is disclosed in U.S. Patent 2,216,685, issued October 1, 1940, to Caesar.

In both of the systems identified above, the control components and the means whereby the moving components are accessible to the stationary components are subject to the excessive wear and misalignment. The systems consequently require continuous supervision and maintenance. Misalignment problems in such systems often lead to misrouting of objects by the conveyor systems.

The inventor herein proposes to provide a multi-channel, multiple-stage shift register device for storing routing information. Each stage of the shift register corresponds to a section of the path defined by the moving conveyor or load-transporting means. Routing information for each object being carried on the conveyor is stored, at any instant in time, in the register stage corresponding to the conveyor path section in which the object is disposed. As the object moves from section to section of the conveyor path, its routing information is shifted from stage to stage.

Appropriate routing information writing, detecting, and gating circuits permanently interconnect the load and discharge station equipment with respectively corresponding stages of the shift register for the purpose of initiating loading and unloading operations.

Inasmuch as each load and discharge station is disposed adjacent a certain section of the conveyor path, its equipment is connected to the register stage corresponding to the certain section. Thus, each station has a corresponding shift register stage.

A synchronizing switch, preferably operated in synchronism with the conveyor chain, accurately times the shifting of control information between the load and discharge station circuits and the shift register as well as the shifting of information from stage to stage in the shift register.

Although, for simplicity of explanation, one embodiment of the present invention has been adapted herein for controlling a conveyor system generally of the type shown in the Caesar patent and another embodiment for controlling a very simple mail sorting conveyor belt, it is to be understood that the invention is easily adapted for use in other types of conveyor systems and that the invention is not to be limited specifically to use with the conveyor apparatus disclosed. Thus, it is to be understood that the invention as set forth in the appended claims is not to be limited to the particular conveyor systems disclosed.

The first-mentioned conveyor system shown diagrammatically herein is an endless, recycling, vertical conveyor system of the type in which objects may be routed from either one of a pair of load stations to either one of a pair of discharge stations. It will be appreciated, however, that as many load and discharge stations as are desired may be used.

The conveyor comprises a pair of spaced wheels one of which is driven by a prime mover. An endless chain, supporting spaced load transporting carriers, is operatively secured to the spaced wheels. The load stations are disposed vertically one above the other on one side of the conveyor and the discharge stations are disposed vertically one above the other on the other side of the conveyor.

Each load station comprises a transfer mechanism for loading objects on the carriers. Each load station also includes a discharge station selector, by means of which an operator at the respective load station can select a predetermined discharge station to which a waiting object is to be routed.

Each discharge station comprises a transfer mechanism which may be generally similar to the transfer mechanisms of the load stations.

In general, when an object is to be routed from a predetermined load station to a predetermined discharge station, an operator at the load station depresses the selector button corresponding to the desired discharge station. When the next empty carrier approaches the load station, the associated transfer mechanism transfers the object to the carrier and the carrier moves in its path toward the desired discharge station.

At the same time that the object is transferred to the carrier, the routing information assigned to the desired discharge station is written into a multi-channel, shift register stage corresponding to the particular load station at which the object is transferred to the carrier. Preferably, the routing information may be in the form of a complex code permutation. The terms "routing information" and "code permutation" will be used interchangeably in the description.

As the object moves along the conveyor path toward the desired discharge station, its routing information is selectively shifted from stage to stage in the shift register toward a stage corresponding to the desired discharge station under the control of the synchronizing switch, which, as mentioned above, operates in synchronism with the conveyor carriers.

As the loaded carrier reaches the desired discharge station, its routing information is shifted into the shift register stage corresponding to the desired discharge station. After a short time interval, the synchronizing switch will render the last mentioned shift register stage, the discharge station gating and detecting circuits, and the discharge station transfer mechanism effective to cause removal of the object from the carrier.

Thus, it can be seen that the shift register gives the course location of each carrier as exemplified by the storing and selective shifting of information corresponding to the object being routed, whereas the synchronizing switch provides a very accurate location of the object within the distance generally located by a shift register stage.

The other conveyor system disclosed herein is a simplified manually loaded conveyor belt system for selectively routing mail sacks to proper unloading stations from which they are loaded on trains. Circuits, similar to those used in the system described above and including a shift register, control the routing of the mail sacks to the unloading stations.

Accordingly, it is an object of the present invention to provide a semi-automatic conveyor control system having few moving parts, whereby the control system will not be subject to misalignment or excessive wear.

It is an object of the present invention to provide a conveyor control system of the analog type in which the analog comprises mechanically stationary components.

It is an object of the present invention to provide a conveyor control system of the type set forth in the object above in which a relatively simple means is provided for accurate synchronization between the conveyor and the control system.

A feature of the present invention is the provision of a stationary shift register analog for a moving conveyor system.

Another feature of the present invention is the use of a simple synchronizing switch to provide accurate synchronization between a conveyor system and its shift register analog control system.

Other objects and features will be evident upon a perusal of the following description in which.

Figure 1A:
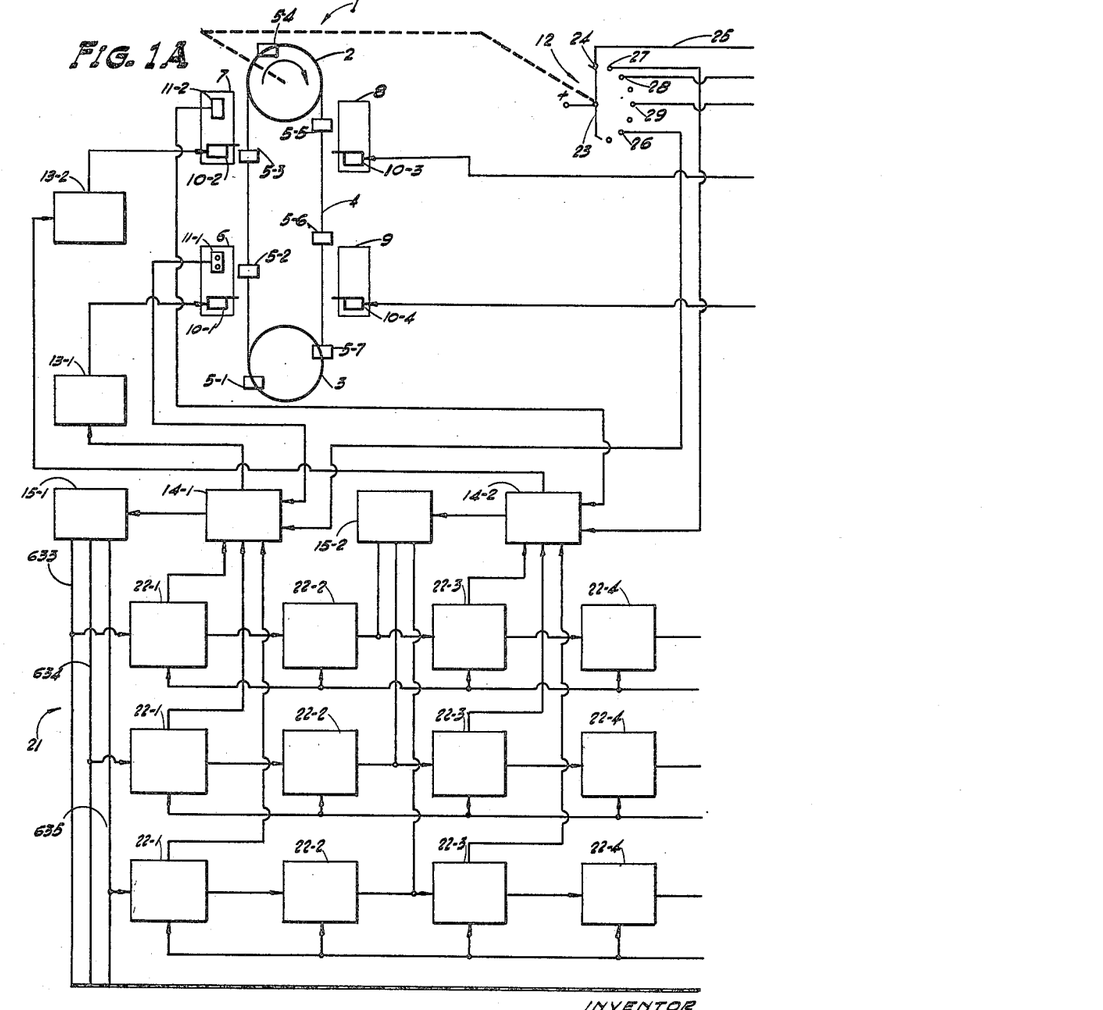
FIGS. 1A and 1B show one embodiment of the conveyor control system diagrammatically.
Figure 1B:
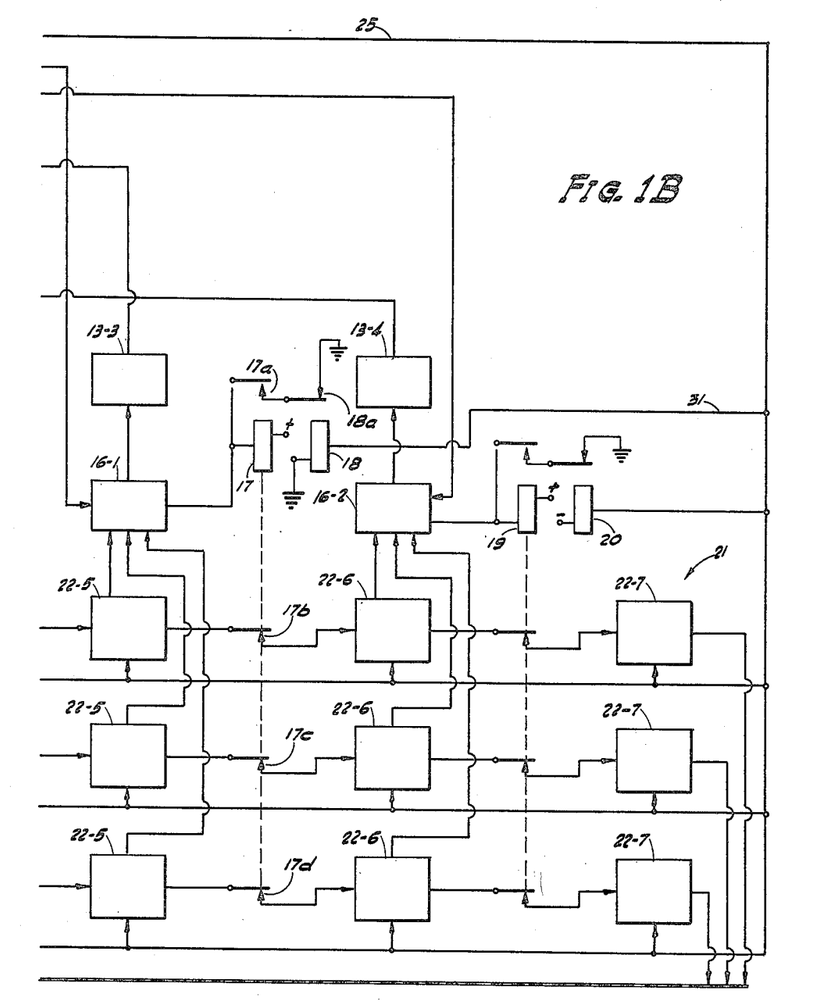

For a clear picture of the system shown in FIGS. 1A and 1B, FIG. 1B is to be placed at the right-hand side of FIG. 1.

Attention is directed to FIGS. 3 to 9 in which most of the relay and switch contacts are shown in detached form. More particularly, normally open detached contacts are represented by a short line perpendicular to the conductors to which they are connected; and normally closed detached contacts are represented by an X intersecting the conductors to which they are connected.

*Description of the Control System of FIGS. 1–10*

With particular reference to FIGS. 1A and 1B, it will be seen that the conveyor system comprises a pair of spaced gear wheels 2 and 3. A prime mover (not shown) drives the wheel 2 in a clockwise direction with respect to FIG. 1A. An endless chain 4 is operatively secured around the wheels 2 and 3. A plurality of equally spaced load transporting carriers 5–1 to 5–7 are carried by the chain 4.

Adjacent the vertical path defined by the carriers as they are moved upwardly are a pair of load stations 6 and 7. A pair of discharge stations 8 and 9 are disposed adjacent the path defined by the carriers as they move downwardly.

The load and discharge stations are provided with transfer mechanisms 10–1 to 10–4 for respectively transferring objects to and from the carriers 5.

The load stations 6 and 7 are provided with discharge station selectors 11–1 and 11–2 respectively.

A synchronizing electro-mechanical switch 12 is operatively secured for rotation with the conveyor. The switch 12 rotates through one complete cycle during movement of the carriers 5, a distance equal to the spacing between succeeding carriers. As will be seen later, the switch 12 provides a means whereby the control circuits to be described below can recognize the exact location of carriers relative to the load and discharge stations at any instance in time.

Motor control circuits 13–1 to 13–4 are provided respectively for the transfer mechanisms 10–1 to 10–4.

Empty carrier detecting circuits 14–1 and 14–2 are provided respectively for the load stations 6 and 7. Code permutation contact assemblies 15–1 and 15–2, controlled respectively by the selectors 11–1 and 11–2, are provided respectively for the load stations 6 and 7. The code permutation contact assemblies 15–1 and 15–2 are utilized for selectively preparing code permutations representative of selected discharge stations when objects are being routed from the load stations to desired discharge stations.

Assigned code detecting circuits 16–1 and 16–2 are provided for detecting routing information assigned respectively to the discharge stations 8 and 9.

A pair of relays 17 and 18 are associated with the assigned code detecting circuit 16–1 for the purpose of causing the erasure of routing information assigned to the discharge station 8 and detected by the circuit 16–1.

Similarly, a pair of relays 19 and 20 are provided for erasing information assigned to the discharge station 9 and detected by the circuit 16–2.

A three channel 7 stage shift register circuit 21 is provided for storing routing information for objects being sent from the load stations to selected discharge stations. Although only 3 channels are used for purposes of the present description, it will be understood that as many channels as are necessary for handling all of the possible code permutations for the various discharge stations will be used in any given commercial installation.

There is provided in the shift register a plurality of stages equal in number to the individual load transporting means provided on the conveyor. The embodiment disclosed utilizes carriers 5–1 to 5–7 attached to the chain 4. Accordingly, since there are 7 carriers shown, there are 7 stages in the shift register 21. It will be understood that commercially available endless chain and belt conveyors utilize many differing methods of transporting objects and that the present invention may be adapted for use with said differing methods.

Each stage in the shift register corresponds to a predetermined section of the path defined by the carriers in their positions shown in FIG. 1A. Further, succeeding stages correspond to succeeding sections along the carrier path.

Thus, the first stage 22–1 corresponds to that section of the carrier path defined by the space between carriers 5–1 and 5–2 in their positions shown in FIG. 1A. Similarly, the second stage 22–2 corresponds to that section of the conveyor path defined by the space between the carriers 5–2 and 5–3 in their positions shown in FIG. 1A. In a similar manner, the succeeding stages 22–3 to 22–7 correspond respectively to those sections of the conveyor path defined respectively by the spaces between carriers 5–3 and 5–4, 5–4 and 5–5, 5–5 and 5–6, 5–6 and 5–7, and 5–7 and 5–1.

Thus, it can be seen that there is a definite fixed relationship between the shift register stages and the carrier path. Consequently, there is a relationship between the shift register stages and the location of the load stations 6 and 7.

More particularly, the load stations 6 and 7 are adjacent to the carrier path sections corresponding to the stages 22–1 and 22–3 of the shift register 21. The only equipment at the load stations which must be located definitely with respect to the conveyor path are the transfer mechanisms 10–1 and 10–2. The operation of the mechanisms must be accurately timed with the movement of the carriers for loading objects on the carriers.

More particularly, the top load-carrying portions of the transfer mechanisms 10–1 and 10–2 must be accurately positioned with respect to the carrier path sections defined by shift register stages 22–1 and 22–3. Thus, the top of the transfer mechanism 10–1 is shown disposed approximately three-quarters of the distance between the beginning and the end of the carrier path section corresponding to stage 22–1. Similarly, the top of the transfer mechanism 10–2 is shown slightly above the beginning of the carrier path section corresponding to the shift register stage 22–3.

Similarly, the top of the transfer mechanism 10–3 of the discharge station 8 is shown approximately one-quarter of the distance between the beginning and end of the carrier path section corresponding to the shift register stage 22–5. The top of the transfer mechanism 10–4 is shown approximately at the center of the carrier path section corresponding to the shift register stage 22–6.

The shift register 21 will now be described with more particularity. As is well known in the art, each stage of the shift register is capable of storing a code permutation representative of certain intelligence—in the present instance, a particular destination or discharge station. It is further well known in the art that information stored in the various stages of the shift register can be simultaneously shifted to respective succeeding stages when a shift pulse is applied simultaneously to all stages.

With this in mind, visualize the stages 22–1 to 22–7 having stored therein routing information for the carriers 5–1 to 5–7, respectively, with the carriers in the positions shown in FIG. 1A. Visualize further that, as soon as the carriers move a distance equal to a spacing between carriers, a shift pulse will cause the information to be shifted to respective succeeding shift register stages. As soon as the carriers again move a distance equal to carrier spacing, another shift pulse will again cause the information to be shifted to succeeding shift register stages—and so on.

Thus, it can be seen that when the carrier 5–1 is moving along the carrier path section corresponding to the shift register stage 22–1 its routing information will be stored in stage 22–1. Similarly, when carrier 5–1 reaches the carrier path section corresponding to the shift register stage 22–2 its routing information will be transferred from the shift register stage 22–1 to stage 22–2.

In a similar manner, routing information for any one of the carriers 5–1 to 5–7 will at any instant in time be stored in the shift register stage corresponding to that section of the carrier path in which the respective carrier is moving.

Of course, it will be understood that a carrier will have routing information associated therewith only when it is transporting an object to a predetermined selected discharge station. Therefore, it can be said alternatively that the object has routing information associated therewith.

It will be noted that the output of the shift register stage 22–7 is connected to the input of the stage 22–1 inasmuch as their respective carrier path sections are succeeding. This arrangement permits objects to be retained on the carriers through more than one cycle of the conveyor in the event that a discharge station cannot accept an object routed thereto the first time the object passes the discharge station.

As described above, the transfer mechanism 10–1 of the load station 6 is adjacent the carrier path section corresponding to the shift register stage 22–1. Also as mentioned above, the code permutation contact assembly 15–1 of the load station 6 is provided for writing code permutations assigned to selected discharge stations into the shift register. Inasmuch as transfer mechanism 10–1 is located adjacent the carrier path section corresponding to the shift register stage 22–1, the code permutation contact assembly 15–1 is connected to the input of stage 22–1.

Similarly, the empty carrier detecting circuits 14–1 of the load station 6 are connected in a manner to be described below to stage 22–1.

Similarly, the code permutation contact assembly 15–2 and the empty carrier detecting circuits 14–2 of the load station 7 are connected to the shift register stage 22–3.

Similarly, the assigned code detecting circuits 16–1 and 16–2 of the discharge stations 8 and 9 are connected respectively to the shift register stages 22–5 and 22–6.

Thus, it can be seen that, as the carriers pass the various load and discharge stations, any routing information associated therewith will be stored in the respective register stages to which the various writing and detecting circuits of the stations are connected. It can be seen therefore, that, as a carrier passes a load station, the empty carrier detecting circuits of that load station have access to the shift register stage in which the routing information, if any, associated with the carrier is stored. Also, if the carrier is loaded at the particular load station, control circuits to be described below will write destination information into the respective shift register stage before the carrier leaves the respective carrier path section.

Similarly, as each carrier passes the discharge station, its routing information, if any, will be stored in the shift register stage to which the assigned code detecting circuits of the discharge station are connected. Thus, as a carrier passes a discharge station its detecting circuits can determine whether or not the carrier has an object routed to the discharge station.

As mentioned above, the synchronizing switch 12 makes a complete cycle during movement of the carriers a distance equal to the carrier spacing. The purpose of the switch 12 is to provide a much more accurate synchronization between the loading, unloading, writing and detecting operations at the various stations and the movement of the carriers past the stations. Although the switch 12 is shown with only 8 possible positions, any number of positions may be used depending upon the accuracy of synchronization desired.

In the first position of the switch 12, as shown in FIG. 1A, wiper 23 engages contact 24. The first position of the switch 12 is utilized for causing the shifting of information in the shift register one stage. More particularly, when the wiper 23 engages the contact 24, it applies positive battery potential to the shift pulse conductor 25, which conductor is connected to each channel of each stage of the shift register 21.

It is deemed preferable to permit no loading or unloading operations to be performed while information is being shifted from one stage to the next in the shift register. Thus, as shown, only 7 positions of the switch 12 are available for initiating loading and unloading operations.

It is assumed for the purpose of this application that the switch 12 is in its position shown in FIG. 1A when the carriers are in the positions shown. It is further assumed that the wiper 23 rotates clockwise with respect to FIG. 1A through one complete cycle as the carriers move a distance equal to their spacing. Thus, wiper 23 will engage each of the 8 contacts and return to engagement with contact 24 while the carrier 5–1 moves from a position shown to the position in which carrier 5–2 is shown.

It is further assumed for the purpose of this application, that the time required for the transfer mechanisms to move into the path of the carriers for loading and unloading functions is relatively short in comparison to the movement of the carriers in their path. It will be understood that if there is an appreciable time lag required for movement of the transfer mechanisms into the path of the carriers, it will be necessary to connect the switch 12 in an appropriate manner to initiate loading and unloading operations a short time interval before the carriers reach a position opposite the transfer mechanisms.

It will be recalled that the top of the transfer mechanism 10–1 is disposed adjacent a position approximately three-quarters of the distance from the beginning to the end of the adjacent carrier path section. Consequently, the position of the switch 12, in which wiper 23 engages its 7th contact 26, is utilized for initiating each loading operation at the load station 6.

Thus, it can be seen that the wiper 23 engages the contact 26 at approximately the same time that the carrier 5–1 approaches the position opposite the transfer mechanism 10–1. Similarly, the wiper 23 will engage the contact 26 as each of the carriers approaches a position opposite the transfer mechanism 10–1.

In a similar manner, the second contact 27 of the switch 12 is utilized to initiate each loading operation at the load station 7 shortly after an approaching carrier enters the adjacent path section. The third contact 28 of the switch 12 is utilized to initiate each unloading operation at the discharge station 8 as an approaching carrier passes a position approximately one fourth of the distance from the beginning to the end of the adjacent path section. Finally, the fifth contact 29 of the switch 12 is utilized to initiate each unloading operation at the discharge station 9 as an approaching carrier passes a position in the middle of the adjacent path section.

Thus, it can be seen that, as each carrier approaches a position adjacent the transfer mechanism of each station, its routing information, if any, can be detected; and a loading or unloading operation can be initiated in the event that the carrier is properly conditioned for such operation.

*Detailed Description of Circuits and Apparatus*

The transfer mechanisms 10–1 to 10–4 may be any one of the types commonly utilized commercially in conveyor systems of the type described. The transfer mechanism will generally have a platform for holding or receiving an object. The platform is moved into the path of conveyor carriers to place objects on or remove objects from carriers.

Figure 2:
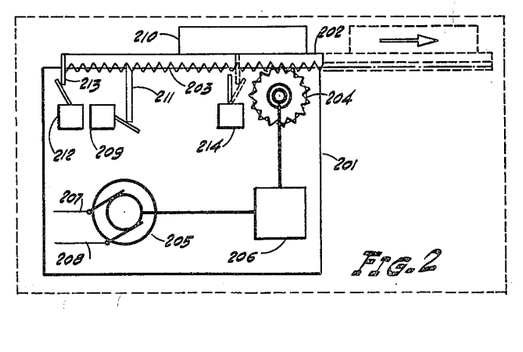
FIG. 2 is a diagrammatic view of a typical transfer mechanism for the system disclosed in FIGS. 1A and 1B.

A typical transfer mechanism of this type will be described. Attention is directed to FIG. 2 which diagrammatically shows a typical transfer mechanism.

The transfer mechanism comprises a housing 201. The platform 202 is secured in any conventional manner, for example, by a tongue and groove assembly, to the upper end of the housing 201 for reciprocable movement as illustrated by the broken line adjacent thereto. The broken line indicates the position that the platform 202 will assume when extended into the path of an approaching carrier to perform a transfer function. The lower edge 203 of the platform 202 is transversely grooved. A pinion 204 meshes with the groove edge 203 to form a rack and pinion assembly.

The right-hand path of the platform 202 is conventional in structure, comprising a plurality of spaced parallel bars which pass through a complementary group of spaced parallel bars which form the base of conventional carriers 4.

A conventional single-phase capacitor starting motor 205 operates the rack and pinion assembly through a speed reducing device 206. The motor 205 can be operated in either direction by reversing the connection of a pair of input leads 207 and 208 to an A.C. source. When the motor 205 is rotated in one direction, the platform 202 is extended into the path of the conveyor carriers; and when the motor 25 is rotated in the opposite direction the platform 202 is retracted to its normal position.

An electrical tray detecting switch 209 is suitably mounted on the housing 201 to detect the presence or absence of a tray 210, a plurality of which are provided for holding objects to be transported by the carrier. The switch 209 is shown in its operated position. An actuator element 211 extending through an aperture (not shown) in platform 202 is depressed by the tray 210 from a position slightly above the upper surface of the platform 202 to a position coincident with the upper surface of the platform 202 to actuate switch 209. When the tray 210 is removed, the element 211 rises to permit the switch 209 to restore to its unoperated position.

A platform position detecting switch 212 suitably mounted on the housing 201 is held in operated position by a projection 213 on the platform 202 when the platform 202 is in its normal retracted position. Transfer mechanism switches corresponding to switch 212 will hereinafter be referred to as "retracted position switches." When the platform 202 begins to move toward its extended transfer position in the carrier path, the projection 213 disengages the switch 212 and switch 212 restores to its unoperated position. When the platform 202 reaches its extended transfer position, the projection 213 actuates an extended position switch 214.

Although all objects transported by the carrier will be placed in trays such as tray 210, the subsequent description will merely refer to the transfer of the objects without mentioning the trays. The use of uniform trays such as 210 permits the transporting of objects of various sizes and configurations without mishap.

It will be noted that the load stations are disposed adjacent that portion of the carrier chain 4 moving upwardly and that the discharge stations 8 and 9 are disposed adjacent that portion of the conveyor chain moving downwardly.

Thus, when a load station transfer mechanism extends its loaded platform into the path of an approaching empty carrier, the spaced parallel bars of the carrier base will pass through the complementary spaced parallel bars of the transfer mechanism platform to remove the object from the platform.

Similarly, when a discharge station transfer mechanism extends its empty platform into the path of an approaching loaded carrier, the spaced parallel bars of the carrier base will pass through the complementary spaced parallel bars of the transfer mechanism platform to leave its object on the transfer mechanism platform.

As is well known in the art, the transfer mechanisms at the discharge stations have associated therewith equipment (not shown) to automatically move objects from the transfer mechanism platform to an adjacent storage rack as soon as the platform retracts to its normal position.

Figure 3:
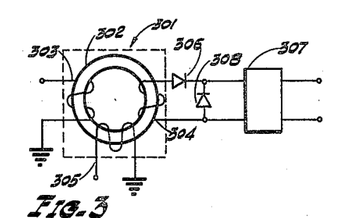
FIGS. 3 and 4 show in detail ferrite core circuits used in the shift register for the system disclosed in FIGS. 1A and 1B.

A typical channel of a shift register stage will now be described in detail. With particular reference to FIG. 3, it will be seen that each channel of the stages 22–2, 22–4, and 22–7 of the shift register 21 may comprise a ferrite core 301 including a core 302, an input winding 303, an output winding 304 and a shift input winding 305. The term "ferrite core" as used herein will refer to the core, its associated windings and the circuit of the output winding. Such usage of the term "ferrite core" is common in the art today.

The ferrite core 301 is one of a type commonly used in the art, and it will be described only briefly. The core 302 is an annular ring made of ferromagnetic material which can be circumferentially polarized in either direction by passing a properly polarized current through either of two coils. When a signal is applied to the input coil 303, the core 302 is magnetized in a predetermined circumferential direction. If the core 302 were magnetized in the opposite direction prior to the application of the pulse to the input winding 303, the reversal of direction of magnetization will produce a corresponding voltage in the output winding 304. However, a conventional diode 306, connected in the circuit of the output winding 304, is polarized so that no current pulse will flow in the circuit of the output winding.

If, subsequent to the application of a pulse to the input winding 303 as described above, a shifting pulse is applied to the shift input winding 305, the direction of magnetization of the core 302 will again be reversed. Again a voltage will be induced in the output winding 304. However, this time the polarization of the induced voltage in winding 304 is such that the diode 306 will pass current in the circuit of the output winding 304.

The current pulse passed by the diode 306 will be momentarily stored in a conventional delay circuit 307, from which circuit the current pulse will, after a short time delay, be fed to the input winding of the ferrite core of the corresponding channel of the succeeding shift register stage. The purpose of the delay circuit 307 is to permit shifting of information already in the succeeding shift register stage prior to the shifting of new information thereto. A conventional diode 308 prevents the feedback of signals from the succeeding shift register stage.

Thus, it can be seen that one bit of a code permutation may be shifted into the shift register channel, maintained therein as long as desired, and subsequently shifted out of the channel at will.

Figure 4:
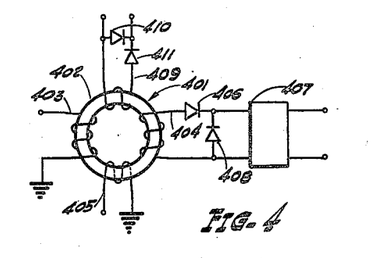

A typical shift register channel which may be used in the stages 22–1, 22–3, 22–5 and 22–6 of the shift register 21 is shown in detail in FIG. 4. The channel disclosed in FIG. 4 is identical to that disclosed in FIG. 3 except that an additional output winding and circuit therefor is added.

More specifically, the ferrite core 401 includes a core 402, an input winding 403, an output winding 404, a shift input winding 405, diodes 406 and 408 and a delay circuit 407 respectively similar to the core 302, the input winding 303, the output winding 304, the shift input winding 305, the diodes 306 and 308 and the delay circuit 307 of FIG. 3. In addition, the ferrite core 401 includes a second output winding 409 which, as will be described below, sends a pulse to its respective detecting circuit such as 14–1, 14–2, 16–1, or 16–2 whenever an input pulse is applied to the input winding 403 from a preceding stage.

As will be described in detail below, information shifted from preceding stages into the stages 22–1, 22–3, 22–5 and 22–6 are to be simultaneously shifted into the respective detecting circuits connected therewith. In one instance, detectors 14–1 and 14–2 will sample information shifted thereto to determine the full or empty condition of the respective carrier. In the other instance, the detecting circuits 16–1 and 16–2 will sample information shifted thereto to determine the presence or absence of a respectively assigned code permutation.

A pair of diodes 410 and 411, connected to the circuit of the second output winding 409, respectively prevent feedback from the respective detecting circuit and prevent signals being transferred to the respective detecting circuit in response to a shift pulse.

In accordance with conventional practice in the art, polarization of each core in such as the core 302 in one direction will be referred to as marking a "0" in the core and polarization of the core in the other direction will be referred to as marking a "1" in the core.

For purposes of the present application, it will be assumed that a shift pulse applied to the input shift winding, corresponding to winding 305, of each shift register channel will mark the ferrite core of that channel with a "0." Also, the application of a pulse to the input winding, corresponding to winding 303, of each channel of the shift register will mark the ferrite core of that channel with a "1." It will be recalled that a pulse is sent to a succeeding shift register channel in response to a shift pulse applied subsequent to an input pulse. Thus, the shifting of code permutations into and from the shift register stages and from stage to stage will be characterized by the transfer of pulses in the code permutation positions having "1's" marked therein and by the absence of a pulse in the code permutation positions having "0's" marked therein.

Inasmuch as the shift register 21 shown by way of example herein is provided with three channels per stage, each code permutation will comprise three bits of information. Thus, the code permutation assigned to the discharge station 8 is 101. The code permutation 011 is assigned to the discharge station 9; and the code permutation 000 is assigned to represent empty carriers which have no routing information associated therewith.

With respect to FIGS. 1A and 1B, the bits of information in the first, second and third positions of each code permutation will be stored respectively in the top, center and bottom channels of each shift register stage 22–1 to 22–7.

As noted above, it will be understood that in any commercial application the number of channels utilized will depend upon the number of discharge stations provided in the conveyor system. Also, it is noted that the particular type of routing information disclosed herein is given by way of example.

Figure 5:
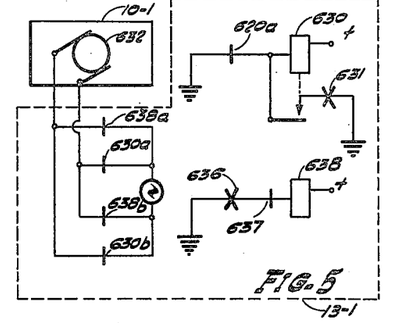
FIGS. 5, 6, 7 and 8 show the circuits associated with one of the load stations of the system disclosed in FIGS. 1A and 1B.

The various control circuits associated with the load station 6 will now be described in detail. Attention is directed to FIG. 5 which shows in detail the motor control circuits 13–1, to FIG. 6 which shows in detail the detecting circuits 14–1, to FIG. 7 which shows the code permutation contact assembly 15–1, and to FIG. 8 which shows the discharge station selector circuits 11–1.

Figures 6, 7, 8:
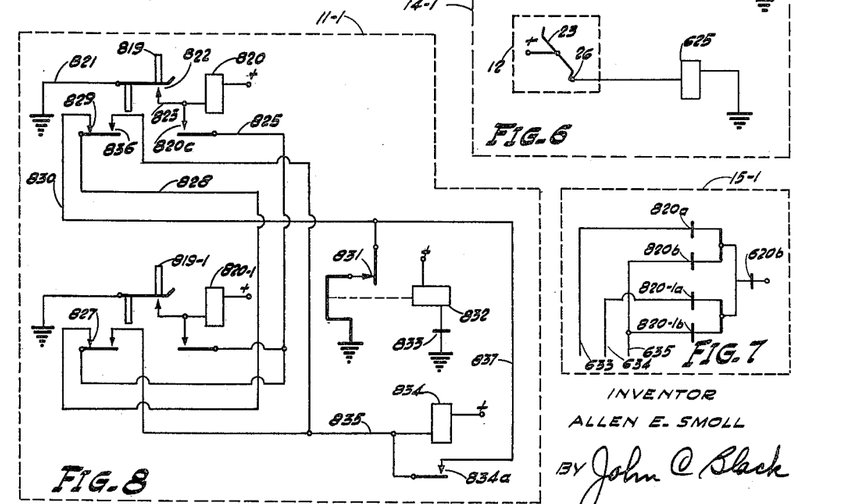

With particular reference to FIG. 8, the discharge station selector 11–1 includes manually operable pushbuttons 819 and 819–1 for the discharge stations 8 and 9 respectively. Relays 820 and 820–1 are energized respectively when the pushbuttons 819 and 819–1 are depressed. For example, pushbutton 819 completes a circuit from ground over conductor 821, contacts 822, conductor 823, and relay 820 to battery. A similar circuit energizes relay 820–1 when the pushbutton 819–1 is depressed.

Spring biased contacts 822 will return pushbutton 819 to its normal position, and relay 820 is held operated over a circuit extending from battery through relay 820, conductor 823, contacts 820c of the relay 820, conductor 825, contacts 827, conductor 828, contacts 829, conductor 830, and contacts 831 to ground.

Contacts 827 and 829 in the holding circuit of relay 820 provide for the restoration of erroneously selected pushbuttons. For example, assume pushbutton 819 had been selected erroneously instead of pushbutton 819–1. Before transfer of a waiting object to a carrier is made, pushbutton 819–1 is depressed. Contacts 827 will open to restore relay 820. At the same time, relay 820–1 is energized and held energized over circuits similar to those described for relay 820.

Relay 820, when energized as described above, closes contacts 820a and 820b which prepare a circuit for writing into the shift register 21 the code permutation 101 assigned to the discharge station 8. The relay 820–1, when energized, closes contacts 820–1a and 820–1b to similarly prepare circuits for writing into the shift register 21 the code permutation 011 assigned to the discharge station 9.

A release relay 832 is provided in selector 11–1 for opening contacts 831 in the holding circuits of the relays 820 and 820–1 to release such relays soon after the initiation of a loading operation. More specifically, relay 832 is energized by contacts 833 which are closed when the transfer mechanism 10–1 at load station 6 moves from its normal retracted position toward its extended position in the path of an approaching carrier.

Relay 834 in selector 11–1 is energized when either of the pushbuttons 819 or 819–1 are depressed. For example, when pushbutton 819 is depressed relay 834 is energized over a circuit extending from battery through relay 834, conductor 835, contacts 836, which make before the contacts 829 break, and contacts 829 and 831 to ground. As soon as relay 834 is energized over the above described circuit, it closes contacts 834a to maintain itself operated over a circuit extended from battery through relay 834, conductor 835, contacts 834a, conductor 837 and contacts 831 to ground. When relay 834 energizes, it closes contacts 834b to prepare an input circuit of a blocking oscillator 621 (FIG. 6) in the detecting circuits 14–1. The blocking oscillator 621 partially controls the initiation of a loading operation as will be described later.

Thus, it can be seen that when one of the pushbuttons such as 819 is depressed, relay 834 will partially prepare a load initiating circuit, and one of the relays such as 820 will prepare a circuit for writing a predetermined code permutation into the shift register stage 22–1.

With particular reference to FIG. 6, it will be noted that the detecting circuit 14–1 includes three ferrite cores 601, 602, and 603, each of which is substantially similar to the ferrite core 301 of FIG. 3. More particularly, the ferrite core 601 includes a core 604, an input winding 605, an output winding 606, and a shift input winding 607. The output winding 606 is connected to one input of an OR circuit 608 by way of a properly polarized diode 609. The diode 609 is polarized in an appropriate manner such that a current pulse will be applied to the OR circuit only in response to a shift pulse in winding 607 subsequent to a "1" marking pulse in the input winding 605.

Similarly, the ferrite core 602 comprises a core 610, an input winding 611, an output winding 612, and a shift input winding 613. A diode 614 connected in the circuit of the output winding 612 is polarized such that a pulse will be applied to a second input of the OR circuit 608 in response to a shift pulse in winding 613 subsequent to a "1" marking pulse in the input winding 611.

Similarly, the ferrite core 603 comprises a core 615, an input winding 616, an output winding 617, and a shift input winding 618. The output winding 617 is connected by way of a diode 619 to a third input to the OR circuit 608. The diode 619 is properly polarized such that an input pulse will be applied to the respective input to the OR circuit 608 only in response to a shift pulse in the winding 618 subsequent to a "1" marking pulse in the input winding 616.

The three input windings 605, 611 and 616 are connected respectively to the output windings, corresponding to winding 409 of FIG. 4, of the top, middle and bottom channels respectively of the shift register stage 22–1 (FIG. 1A).

It will be remembered that as described above a current pulse will be produced in the output circuit of the winding 409 only in response to the application of a "1" marking pulse to the input winding 403. Marking pulses will be applied to certain of the input windings 605, 611, and 616 in response to the shifting of a code permutation assigned to one of the discharge stations from the preceding stage 22–7 into the stage 22–1. As will be described in detail later, code permutations shifted into the stage 22–1 from the code permutation contact assembly 15–1 (FIG. 7) will be prevented from being transferred into the ferrite cores 601, 602 and 603 by the opening of contacts 620a, 620b and 620c of a load-initiating relay 620.

The detecting circuits 14–1 also include a blocking oscillator 621. The oscillator 621 shown diagrammatically is a conventional circuit including a 5-element thyratron (not shown). The control grid of the thyratron is normally biased negative below cutoff to prevent conduction by the thyratron even while positive voltage is applied to the plate. If a positive voltage of sufficient amplitude is then applied to the suppressor grid of the thyratron, the thyratron will conduct. The oscillator 621 also includes a typical RC circuit connected to the thyratron grid. The RC circuit is charged by the plate current to the thyratron when it conducts, and it biases the grid sufficiently negative to prevent conduction of the thyratron for a length of time determined by the RC values. Thus, it can be seen that the application of a positive voltage of sufficient amplitude to the suppressor grid of the thyratron produces the short interval of conduction in the plate circuit of the thyratron followed by a period of nonconduction.

The blocking oscillator 621 has an output conductor 622 connected to the thyratron plate circuit and an input conductor 623 connected to the suppressor grid of the thyraton. The input conductor 623 is connectable to a positive firing potential by way of the normally open contacts 624, 625a and 834b. The contacts 624 correspond to contacts of a tray detecting switch corresponding to switch 209 of FIG. 2. Contacts 624 will be closed to prepare the input circuit of the blocking oscillator 621 whenever an object is placed on the transfer mechanism 10–1 of the load station 6 preparatory to being routed to a predetermined discharge station.

Contacts 834b are operated by the relay 834 of the discharge station selector 11–1 described above whenever the selector pushbutton 819 or 819-1 is actuated to prepare routing instructions for an object to be routed from the load station 6 to a desired one of the discharge stations. When the contacts 834b are closed they partially prepare the input circuit of the blocking oscillator 621.

Contacts 625a are closed by a synchronizing relay 625 each time that the wiper 23 of the synchronizing switch 12 engages contact 26, indicating that a carrier is in position adjacent the transfer mechanism 10–1 to accept an object. When the relay 625 operates to close contacts 625a, it completes the input circuit of the blocking oscillator 621 in the event that the contacts 623 and 834b are previously closed.

Thus, is can be seen that a positive firing potential will be applied to the blocking oscillator 621 when all three contacts 624, 625a and 834b are closed—that is, when an object has been placed on the transfer mechanism 10–1, when the selector 11–1 has been actuated, and when subsequently the carrier reaches a predetermined position adjacent the transfer mechanism 10–1.

In other words, the blocking oscillator 621 will fire to apply an output pulse to the conductor 622 each time that a carrier approaches the transfer mechanism 10–1 while an object at the load station 6 is conditioned for routing to a selected discharge station.

When the synchronizing relay 625 operates as described above, it also closes contacts 625b to apply a shift pulse to each of the shift input windings 607, 613 and 618 of the ferrite cores 601, 602 and 603 respectively. It will be remembered that, as an approaching carrier moves into the carrier path section corresponding to the shift register stage 22–1, its routing information, if any, is simultaneously shifted from register stage 22–7 to the register stage 22–1. It will further be recalled that routing information shifted from the stage 22–7 into the stage 22–1 is also shifted into the ferrite cores 601, 602 and 603. Thus, if a carrier approaching the transfer mechanism 10–1 is empty, no marking pulses will be applied to the input windings of the ferrite cores 601, 602 and 603, inasmuch as the code permutation 000 is assigned to empty carriers; and, if the carrier is full, marking pulses corresponding to the code permutation 101 or 011 assigned to the selected discharge station 8 or 9 are applied to the inputs of the ferirte cores 601 and 603 or 602 and 603. Consequently, when the synchronizing contacts 625b are closed as described above, no input pulse will be applied to the OR circuit 608 if the approaching carrier is empty; and two input pulses will be applied to the OR circuit 608 if the approaching carrier is loaded.

The OR circuit 608 may be any one of a number of circuits well known in the art which produces an output pulse in response to an input pulse in any one of a number of inputs to the OR circuit. Thus, if an empty carrier is approaching, the OR circuit 608 will produce no output pulse; however, each time that a loaded carrier approaches, the OR circuit 608 will produce a pulse at its output conductor 627.

The output conductor 627 of the OR circuit 608 and the output conductor 622 of the blocking oscillator 621 are connected to a complementor gate 628. The complementor gate 628 is provided for applying an output pulse to its output conductor 629 to operate the previously mentioned load initiating relay 620 only in the event that the OR circuit 608 does not produce a pulse at conductor 627 when the blocking oscillator 621 produces a pulse at its output conductor 622.

It will be recalled that the synchronizing relay 625 initiates the operation of the OR circuit 608 and the blocking oscillator 621 in the event that the required conditions are fulfilled. It will be further recalled that the conditions for operating the blocking oscillator 621 are fulfilled in the event that an object is placed on the transfer mechanism 10–1 and the selector 11–1 is actuated. It will further be recalled that the condition to be fulfilled to result in no output pulse by the OR circuit 608 is the approach of an empty carrier.

Thus, the complementor gate 628 will operate the load-initiating relay 620 when an empty carrier approaches subsequent to the loading of the transfer mechanism 10–1 and the actuation of the selector 11–1.

The complementor gate 628 may be any one of a number of circuits well known in the art. For example, the complementor gate 628 may include a conventional pentode. The pentode is normally biased negative below cutoff and therefore is normally nonconducting. If a positive pulse of sufficient amplitude is applied to the control grid of the pentode, the pentode will conduct. However, if a negative pulse of sufficient amplitude is applied to the suppressor grid of the pentode at the same time that the positive pulse is applied to the control grid, conduction by the pentode will be prevented.

Thus, by connecting the output conductor 627 of the OR circuit 608 to the suppressor grid of the pentode of the complementor gate 628 in such manner that the pulses drive the suppressor grid negative and by connecting the output conductor 622 of the blocking oscillator 621 to the control grid of the pentode in such manner that the pulses drive the control grid positive, the complementor gate 628 will produce an output pulse at conductor 629 only if the blocking oscillator 621 applies a pulse to the conductor 622 when the OR circuit 608 does not apply a pulse to its output conductor 627.

Thus, it can be seen that the load-initiating relay 620 will operate consequent to the operation of the synchronizing relay 625 in the event that an empty carrier is adjacent the transfer mechanism 10–1 subsequent to the placing of an object on the transfer mechanism 10–1 and actuation of the discharge station selector 11–1.

With particular reference to FIG. 5, it will be seen that the operation of the load-initiating relay 620 closes contacts 620a to complete an obvious circuit for locking itself operated including normally closed contacts 631 of an extended position switch similar to switch 214 in FIG. 2. When the motor start relay 630 operates, it also closes contacts 630a and 630b to energize a motor 632 of the transfer mechanism 10–1. The motor 632, which corresponds to the motor 205 of FIG. 2, causes the platform of the transfer mechanism 10–1 to move to its extended position in the path of the approaching empty carrier. When the platform reaches its extended position, contacts 631 will be opened to restore the motor start relay 630. Contacts 630a and 630b will open to stop the motor 632.

Thus, when the load-initiating relay 620 operates as described above, it will cause the platform of the transfer mechanism 10–1 to be extended into the path of the approaching empty carrier in preparation for the removal of an object from the transfer mechanism 10–1 by the carrier.

When the load-initiating relay 620 operates, it also closes contacts 620b (FIG. 7) in the code permutation contact assembly 15–1. As described above, the code permutation contacts 820a and 820b are closed by the relay 820 (FIG. 8) consequent to the operation of the pushbutton 819 which is assigned for selecting the discharge station 8. Similarly, contacts 820–1a and 820–1b are closed by their relay 820–1 consequent to the actuation of the pushbutton 819–1 which is assigned for selecting the discharge station 9.

Thus, when the load-initiating relay 620 closes contacts 620b, a circuit will be completed for writing a code permutation assigned to the desired discharge station into the three channels of the shift register stage 22–1. More particularly, if the pushbutton 819 (FIG. 8) has been actuated, positive battery potential will be extended by way of contacts 620b (FIG. 7), contacts 820a and 820b, and conductors 633 and 635 to the inputs of the upper and lower channels of the shift register stage 22–1 (FIG. 1) to mark the code permutation 101 assigned to the discharge station 8 in the shift register stage 22–1.

Similarly, if the pushbutton 819–1 (FIG. 2) has been actuated, positive battery potential will be extended by way of contacts 620b (FIG. 7), contacts 820–1a and 820–1b, and conductors 634 and 635 to the middle and lower channels of the shift register stage 22–1 (FIG. 1) to mark the code permutation 011 assigned to the discharge station 9 in the shift register stage 22–1.

When the load-initiating relay operates as described above to cause the writing of a code permutation into the shift register stage 22–1, it also opens contacts 620c, 620d, and 620e to prevent the code permutation from being shifted into the ferrite cores 601, 602 and 603.

When, subsequent to the movement of the platform of the transfer mechanism 10–1 into the carrier path as described above, the carrier removes the object from the platform, contacts 636 (FIG. 5) of the tray detecting switch will be closed. Contacts 636 were previously opened when the object was placed on the platform of the transfer mechanism 10–1. Normally open contacts 637 of an extended position switch, similar to switch 214 of FIG. 2, were previously closed consequent to the movement of the platform of the transfer mechanism 10–1 into its extended position in the carrier path.

Thus, when the contacts 636 are closed as described above, upon removal of the object from the transfer mechanism 10–1, an obvious circuit will be completed for operating the motor start relay 638. The motor start relay 638 closes contacts 638a and 638b to energize the motor 632 for retracting the platform of the transfer mechanism 10–1 to its normal retracted position. When the platform reaches its retracted position, contacts 637 open to restore the motor start relay 638. Contacts 638a and 638b open to stop the motor 632.

Thus, it can be seen that when an empty carrier approaches a load station 6 subsequent to the placing of an object on the platform of the transfer mechanism 10–1 and the actuation of the discharge station selector 11–1, the transfer mechanism 10–1 will be moved into the path of the approaching empty carrier for removal of the object therefrom; and the code permutation assigned to the selected discharge station will be written into the shift register stage 22–1.

After an object is transferred from the load station 6 (FIG. 1A) to one of the carriers 5–1 to 5–7, the carrier moves toward the selected discharge station. As the carrier moves into succeeding conveyor path sections, its associated code permutation assigned to the selected discharge station is shifted from the shift register stage 22–1 to succeeding stages in synchronism with the movement of the loaded carrier.

More particularly, each time that the loaded carrier moves from one conveyor path section to the next, the wiper 23 of the synchronizing switch 12 engages its first contact 24 to extend positive battery potential to each stage of the shift register 21 by way of the shift pulse conductor 25.

When the loaded carrier approaches the selected discharge station, for example, station 8, its associated code permutation is shifted to the shift register stage 22–5 which corresponds to the conveyor path section adjacent which the discharge station 8 is located.

Figure 9:
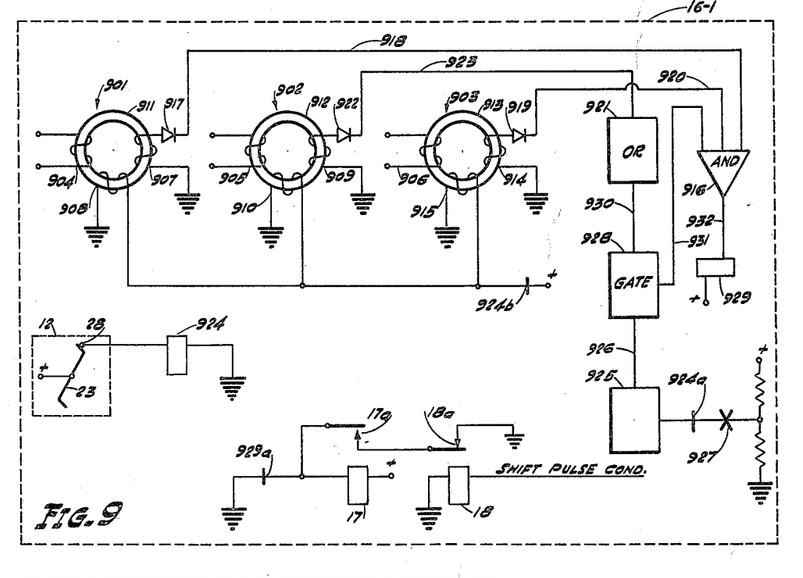
FIGS. 9 and 10 show the circuits associated with one of the discharge stations of the system disclosed in FIGS. 1A and 1B.

At the same time that the code permutation is shifted into the shift register stage 22–5 it is also shifted into three ferrite cores 901, 902 and 903 of the detecting circuits 16–1 of the discharge station 8. More particularly, when the "1" marking pulses of a discharge station code permutation are applied to the respective channels of the shift register stage 22–5, corresponding pulses are produced in the circuits of the output windings of said respective channels corresponding to the output winding 409 of FIG. 4. Said output windings of the top, middle and lower channels of the shift register stage 22–5 are connected respectively to the input windings 904, 905 and 906 of the ferrite cores 901, 902 and 903. The pulses produced in the output windings will therefore be applied to the respective windings 904, 905 and 906 of the ferrite cores 901, 902 and 903.

Thus, if the code permutation 101 assigned to station 8 is associated with an approaching loaded carrier, "1's" will be marked in ferrite cores 901 and 903. Similarly, if the code permutation 011 is associated with the loaded carrier, "1's" will be marked in the ferrite cores 902 and 903.

The ferrite cores 901, 902 and 903 are generally similar to the ferrite core 301 of FIG. 3. Thus, the ferrite core 901 includes a core 911, an input winding 904, an output winding 907, and a shift input winding 908. Similarly, the ferrite core 902 includes a core 912, an input winding 905, an output winding 909, and a shift input winding 910. Similarly, the ferrite core 903 includes a core 913, an input winding 906, an output winding 914, and a shift input winding 915.

The output windings 907 and 914 of the ferrite cores 901 and 903 are connected to two inputs of an AND circuit 916 by way of a diode 917 and a conductor 918, and a diode 919 and a conductor 920 respectively. The output winding 909 of the ferrite core 902 is connected to an input to an OR circuit 921 by way of a diode 922 and a conductor 923. The diodes 917, 919 and 922 are polarized such that pulses will be applied to the AND circuit 916 and the OR circuit 921 only in response to an impulse applied to the respective shift input windings subsequent to the marking of "1's" in the respective ferrite cores.

Shortly after a loaded carrier approaches the discharge station 8 and the associated code permutation is shifted into the shift register stage 22–5 and into the ferrite cores 901, 902 and 903, the wiper 23 of the synchronizing switch 12 will engage the contact 28 to operate a synchronizing relay 924 over an obvious circuit. The synchronizing relay 924 closes contacts 924a in the input circuit of a blocking oscillator 925. The blocking oscillator 925 is similar to the blocking oscillator 621 of FIG. 6 and will produce a pulse at its output conductor 926 in response to the completion of its input circuit.

Normally closed contacts 927 are provided in the input circuit of the blocking oscillator 925. The purpose of the contacts 927 is to prevent an unloading operation at the discharge station 8 in the event that there is no room to accept an additional object. The switch 927 may be any one of a number of switches conventional in the art for sensing the full condition of the last available position in the storage rack associated with the discharge station 8. When the storage rack is completely full, the contacts 927 will be opened to prevent the operation of the blocking oscillator 925 and to prevent the unloading of an object at the discharge station 8 until an operator clears the storage rack.

Assuming that, when the synchronizing relay 924 operates as described above, the discharge station 8 has room to accept an additional object, the contacts 924a will close to cause the blocking oscillator 925 to apply an output pulse to the conductor 926. The conductor 926 is connected to the control grid of the pentode of a complementor gate 928 which is similar to the complementor gate 628 (FIG. 6).

When the synchronizing relay 924 operates as described above, it also closes contacts 924b to apply a shift pulse to the shift input windings 908, 910 and 915 of the ferrite cores 901, 902 and 903. The shift pulse applied to the ferrite cores 901, 902 and 903 will cause corresponding pulses in the output windings of any of the ferrite cores having "1's" marked therein.

Thus, if an empty carrier represented by the code permutation 000 is approaching the discharge station 8, no output pulses will be produced in the output windings 907, 909 and 914 of the ferrite cores 901, 902 and 903. However, if a loaded carrier is approaching the discharge station 8 having the code permutation 101 assigned to the discharge station 8 associated therewith, the shift pulse will cause corresponding pulses in the output windings 907 and 914 of the ferrite cores 901 and 903. If a loaded carrier is approaching the discharge station 8 having the code permutation 011 assigned to the discharge station 9 associated therewith, the shift pulse will cause corresponding pulses in the output windings 909 and 914 of the ferrite cores 902 and 903.

In the event that the code permutation 101 is stored in the ferrite cores 901, 902 and 903 when the synchronizing relay 924 is operated, an unload-initiating relay 929 will be operated. More particularly, pulses produced in the output windings 907 and 914 of the ferrite cores 901 and 903 will be applied to two of the three inputs of the AND circuit 916. Inasmuch as no pulse is produced in the output winding 909 of the ferrite core 902, the OR circuit 921 will produce no pulse in its output conductor 930. The conductor 930 is connected to the suppressor grid of the complementor gate 928. With an output pulse at the output conductor 926 of the blocking oscillator 925 and no output pulse at the output conductor 930 of the OR circuit 921, the complementor gate 928 will produce a pulse at its output conductor 931. The conductor 931 is connected to the third input at the AND circuit 916.

The AND circuit 916 may be any one of a number of circuits well known in the art which will produce an output pulse only in response to the simultaneous application of pulses to all of a plurality of inputs to the AND circuit.

Thus, in the event that pulses are produced simultaneously in the output windings 907 and 914 of the ferrite cores 901 and 903 and at the output conductor 931 of the complementor gate 928, the AND circuit 916 will produce a pulse at its output conductor 923 to operate the unload-initiating relay 929.

Thus, it can be seen that the relay 929 will be operated consequent to the operation of the synchronizing relay 924 at a time when the code permutation 101 of the discharge station 8 is stored in the ferrite cores 901, 902 and 903.

In the event that an empty carrier approaches the load station 8, the code permutation 000 will be transferred to the ferrite cores 901, 902 and 903. Consequently, when the synchronizing relay 924 operates contacts 924b to apply a shift pulse to the ferrite cores 901, 902 and 903, no pulses will be produced in the output windings 907 and 914. Thus, the AND circuit 916 will not produce a pulse in its output conductor 932. Therefore, the unload-initiating relay 929 will not be operated.

Similarly, in the event that a loaded carrier approaches the station 8 with an object routed to the station 9, the code permutation 011 will be transferred to the ferrite cores 901, 902 and 903. Subsequently, when the synchronizing relay 924 operates the contacts 924b to apply a shift pulse to the ferrite cores 901, 902 and 903, output pulses will be produced in the windings 909 and 914 of the ferrite cores 902 and 903. The pulse produced in the output winding 909 will be applied to the input of the OR circuit 921 to cause a pulse to be produced in the output conductor 930 of the OR circuit 921. The pulse at conductor 930 prevents the complementor gate 928 from producing an output pulse at the conductor 931 in response to the output pulse of the blocking oscillator 925 at the conductor 926. Also, the shift pulse will produce no corresponding pulse in the output winding 907 of the ferrite core 901. With no output pulse from the ferrite core 901 or from the complementor gate 928, the AND circuit 916 cannot produce an output pulse to operate the unload-initiating relay 929.

Thus, it can be seen that the relay 929 will be operated to initiate an unloading operation at the discharge station 8 only in the event that an approaching loaded carrier has associated therewith the code permutation 101 assigned to the discharge station 8.

It will be noted that whenever the synchronizing relay 924 operates the contacts 924b to apply a pulse to the shift input windings 908, 910 and 915 it erases any discharge station code permutation previously stored in the ferrite cores 901, 902 and 903, leaving "0's" marked therein.

When the unload-initiating relay 929 operates as described above, it closes contacts 929a to operate an erase relay 17 shown in FIGS. 1B and 9. Relay 17 locks itself operated over an obvious circuit including its contacts 17a and contacts 18a of a release relay 18. With particular reference to FIG. 1B, it will be seen that the relay 17 when operated opens contacts 17b, 17c and 17d. When the contacts 17b, 17c and 17d are open, the code permutation stored in the stage 22–5 cannot be shifted to the stage 22–6 in response to the next shift pulse and is therefore "erased." This occurs of course only when the relay 929 (FIG. 9) is operated to initiate an unloading operation at the station 8. When the shift pulse is subsequently applied to the stages of the shift register 21 to shift routing information one stage, it also operates the release relay 18 shown in FIGS. 1B and 9 by way of wiper 23 and contact 24 of the synchronizing switch 12, the shift pulse conductor 25, and conductor 31. When relay 18 operates, it opens contacts 18a to restore the release relay 17.

Thus, it can be seen that when the assigned code permutation 101 is detected at the discharge station 8, the code permutation is erased from the shift register 21.

Figure 10:
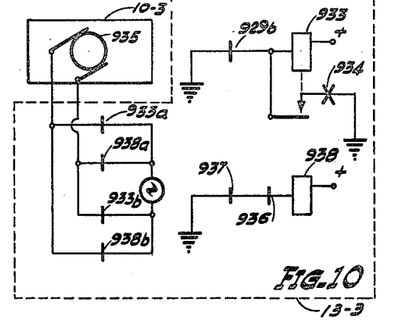

Particular reference is now directed to FIG. 10. When the unload-initiating relay 929 is operated as described above consequent to the detection of the code permutation 101 assigned to the discharge station 8, it also closes contacts 929b to operate a motor start relay 933 in the motor control circuit 13–3. The motor start relay 933 locks itself operated over an obvious circuit including normally closed contacts 934 of an extended position switch of the transfer mechanism 10–3 similar to the switch 214 of FIG. 2. When the relay 933 operates, it also closes contacts 933a and 933b to operate the motor 935 of the transfer mechanism 10–3. The motor 935 moves the platform of the transfer mechanism 10–3 to its extended position in the path of the approaching carrier, in which position the contacts 934 open. The relay 933 restores to stop the motor 935.

The transfer mechanism 10–3 remains inactive until the approaching carrier deposits its object on the extended platform of the mechanism. When the object is deposited on the platform of the transfer mechanism 10–3, contacts 936 of a tray detecting switch of the transfer mechanism 10–3 similar to the switch 209 of FIG. 2 close.

When the platform of the transfer mechanism 10–3 is moved toward its extended position as described above, contacts 937 of a retracted position switch similar to switch 212 of FIG. 2 are closed to prepare a circuit for operating the motor start relay 938.

Thus, when the tray detecting switch closes contacts 936 consequent to the carrier depositing its object on the transfer mechanism 10–3, the motor start relay 938 will be operated over an obvious circuit including contacts 937. The motor start relay 938 closes contacts 938a and 938b to cause the motor 935 to return the platform of the transfer mechanism 10–3 to its normal retracted position. The contacts 937 will open when the platform reaches its retracted position to restore the motor start relay 938. Relay 938 opens contacts 938a and 938b to stop the motor 935. The object is transferred from the transfer mechanism platform to a storage rack in a manner well known in the art and the tray detecting switch will open contacts 936.

Thus it can be seen that, as a loaded carrier having associated therewith the assigned code permutation 101 approaches the discharge station 8, the code permutation will be shifted into the shift register stage 22–5 and into the ferrite cores 901, 902 and 903; the synchronizing switch 12 will cause the code permutation to be detected to operate the unload-initiating relay 929; and the relay 929 will cause the transfer mechanism 10–3 to remove the object from the carrier and will cause the code permutation to be erased from the shift register 21.

*Routing of an Object From the Load Station 6 to the Discharge Station 8*

When it is desired to route an object from the load station 6 (FIG. 1) to the discharge station 8, an operator at the load station 6 will place the object on the platform of the transfer mechanism 10–1. The operator will then depress the pushbutton 819 (FIG. 8) of the discharge station selector 11–1.

When the next empty carrier reaches the load station 6, the synchronizing switch 12 will cause the operation of the load-initiating relay 620 (FIG. 6). The load-initiating relay 620 will cause the transfer mechanism 10–1 (FIG. 1) to deposit the object on the empty carrier and will cause the code permutation 101 to be written into the shift register stage 22–1 by way of the code permutation contact assembly 15–1.

The carrier, loaded with the object, will move along the conveyor path toward the discharge station 8. The synchronizing switch 12 will cause the shifting of the code permutation 101 from the shift register stage 22–1 into succeeding shift register stages in synchronism with the movement of the loaded carrier to succeeding conveyor path sections.

As the loaded carrier reaches the conveyor path section adjacent which the discharge station 8 is disposed, the code permuation 101 will be shifted into the shift register stage 22–5 and into the ferrite cores 901, 902 and 903 (FIG. 9) of the assigned code detecting circuits 16–1.

Shortly thereafter, the wiper 23 of the synchronizing switch 12 will engage its contact 28 to cause the operation of the synchronizing relay 924. Assuming that the discharge station 8 has room to accept the object, the synchronizing relay 924 will cause the operation of the unload-initiating relay 929.

The unload-initiating relay 929 will cause the transfer mechanism 10–3 to remove the object from the carrier and will cause the code permutation 101 to be erased from the shift register 21.

Figure 11:
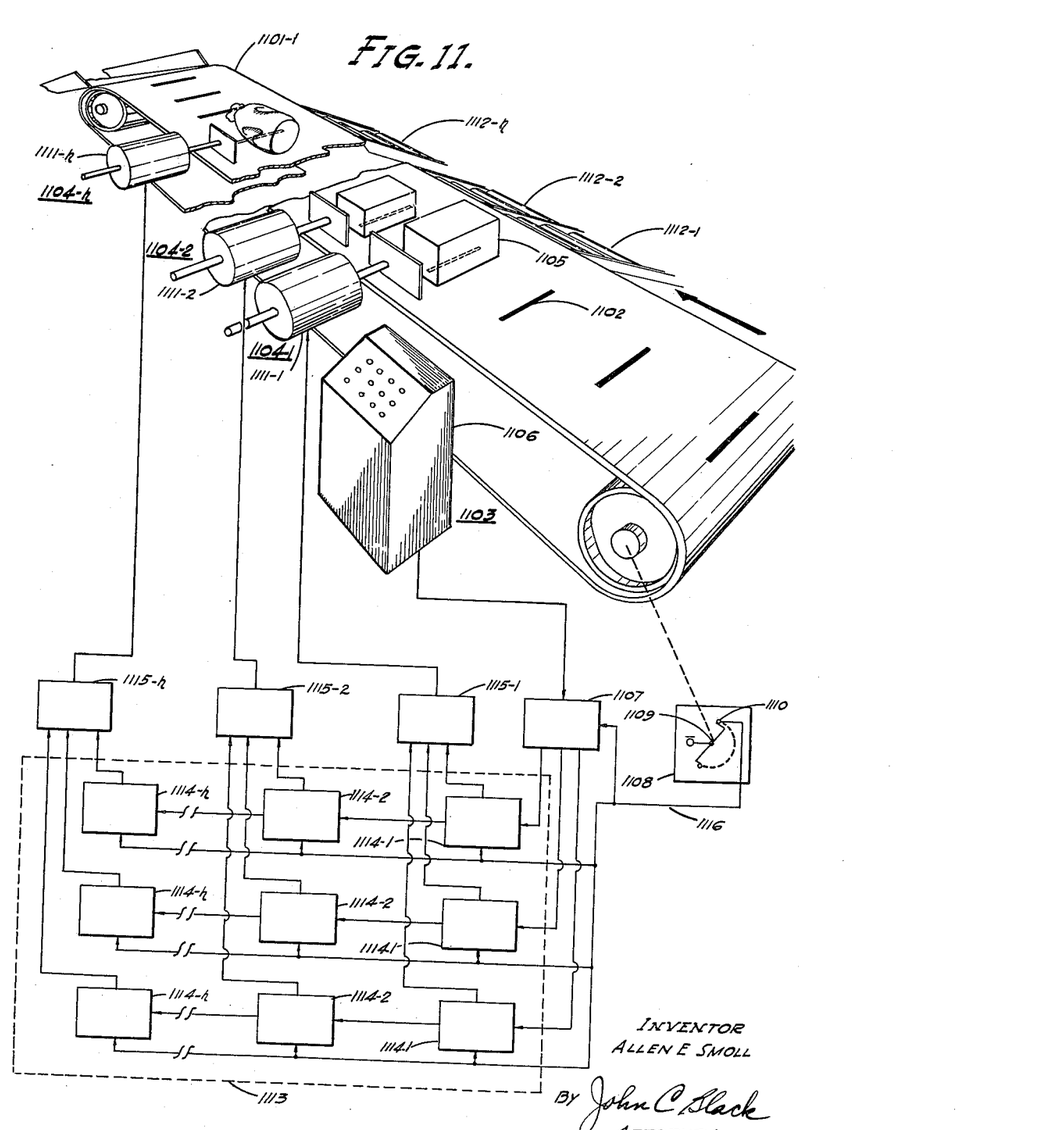
FIG. 11 illustrates another embodiment diagrammatically.

*Description of the Control System of FIG. 11*

The second embodiment disclosed diagrammatically in FIG. 11 will now be described. It will be seen during the following description that the second embodiment has been simplified in many respects for ease of explanation. A typical use for which the embodiment of FIG. 11 may be advantageously employed is the sorting of mail bags and parcel post packages prior to loading of the bags and packages on trains for shipment to their respective destinations.

The second embodiment includes a motor driven endless conveyor belt 1101 preferably having equally spaced lines 1102 placed thereon. The lines 1102 may be spaced conveniently for example three feet apart. The system includes a load station 1103 and a plurality of discharge stations 1104–1, 1104–2, 1104–n.

It will be recalled that the conveyor path of the embodiment of FIGS. 1A and 1B was divided into 7 sections to accommodate the seven carriers 5–1 to 5–7 and that a stage of the shift register 21 was assigned to each of the seven sections.

In the second embodiment disclosed in FIG. 11, the belt 1101 is divided into sections, each section extending in either direction from a line 1102 to positions half way to the next adjacent lines on either side. Each belt section is the equivalent of a carrier such as 5–1.

However, the effective portion of the conveyor path in FIG. 11 is only that portion extending from the load station 1103 to the last discharge station 1104–n. Accordingly, the embodiment of FIG. 11 is preferably provided with a shift register 1113 (to be described in detail later) with a plurality of stages equivalent to the number of belt sections that extend from the load station 1103 to the last discharge station 1104–n.

It will be understood that the control circuit components and operations of the system of FIG. 11 will be similar to those of the system of FIGS. 1–10 except where it is stated to be different.

An operator will load packages 1105 on the belt 1101 with the packages centered on one of the lines 1102. Although the packages can be loaded automatically in a manner similar to that described with respect to the first described embodiment, it will be assumed that the packages are loaded manually in the embodiment of FIG. 11. Each time that the operator loads a package 1105 on the belt 1101, he actuates a pushbutton of a discharge station selector 1106 which corresponds to the particular discharge station to which the package is to be routed. The selector 1106 may be similar to the selector 11–1 described previously. The selector 1106 controls a code permutation contact assembly 1107 in a manner similar to that described earlier in which selector 11–1 controls the assembly 15–1.

A synchronizing switch 1108 generally similar to switch 12 is rotated in synchronism with the conveyor belt 1101 such that its wiper 1109 engages its contact 1110 each time the conveyor belt 1101 moves a distance equal to the spacing between the lines 1102. When the wiper 1109 engages the contact 1110, a shift pulse is sent to each shift register stage.

It will be assumed for ease of explanation that the stations 1103, 1104–1, 1104–2, etc. will all be equally spaced with their spacing being equal to the spacing between the lines 1102. Therefore, only one contact of the switch 1108 need be used. It will be appreciated that in actual practice that the stations will not, in many instances, be so spaced and that therefore, the use of several positions of the switch 1108 will be necessary for proper synchronization in much the same manner as described with respect to the first embodiment.

Attention is directed to the conveyor belt 1101 which does not provide for recycling of the packages 1105 in the event that the desired discharge station is full and cannot accept the package 1105. In such an event, the conveyor belt 1101 may be stopped by a simple switch (not shown); or the package may be deposited at a station provided at the end of the belt. Inasmuch as no provision is made for recycling of the packages, the control circuits are simplified by the elimination of certain of the control components such as the empty carrier detecting circuits 14–1 and 14–2 of FIG. 1A and the erase relays 17–20 of FIG. 1B. All routing information may be conveniently erased at the last discharge station 1104–n.

Each of the discharge stations, such as 1104–1, may have a simplified transfer mechanism in the form of a solenoid actuated pusher 1111 which is actuated to push a package 1105 from the belt 1101 to a gravity feed roller conveyor, such as 1112, disposed adjacent the discharge station incident to the detection of a routing code assigned to the discharge station. The package will be carried by the conveyor 1112 to a location at which it may be loaded on the proper railroad car.

A shift register 1113 similar to the shift register 21 is provided. The shift register 1113 includes a multi-channel stage for each discharge station because the stations are spaced equally with conveyor belt section lengths. Although the shift register 1113 is shown with only three channels, it will be readily appreciated that in an actual installation it will have as many stages as are required to accommodate the number of discharge stations. Thus, the shift register 1113 includes stages 1114–1, 1114–2, and 1114–n respectively for the discharge stations 1104–1, 1104–2, and 1104–n.

Each shift register stage such as 1114–1 may for example include a circuit generally similar to that shown in FIG. 4. Each time that the synchronizing switch 1108 connects the wiper 1109 to the contact 1110 to produce a shift pulse, information in each shift register stage will be shifted to the next stage; and, in the event that a package has been loaded on the belt 1101 and the selector 1106 has been actuated, a predetermined assigned routing code will be transferred from the contact assembly 1107 into the first stage 1114–1 by the shift pulse.

With particular reference to FIG. 4, it will be recalled that each time that marking signals corresponding to a "1" are applied to the inputs of a shift register stage incident to receipt of a shift pulse, the signals are reproduced in certain windings such as winding 409 for the purpose of detecting the presence or absence of the particular code assigned to the discharge station corresponding to the shift register stage. In the present embodiment, such signals are fed to detector circuits 1115–1, 1115–2, and 1115–n in a similar manner.

The detector circuits 1115–1, 1115–2, and 1115–n are somewhat similar to but substantially less complex than the detecting circuit 16–1 which is shown in detail in FIG. 9. It will be recalled that the embodiment of FIG. 11 uses only one synchronizing pulse because each of the stations is equally spaced a distance equal to the spacing between the lines 1102. Therefore, the detecting circuits 1115–1, 1115–2, and 1115–n do not require storage devices such as 901, 902 and 903 (FIG. 9). Rather, the outputs of the shift register stage windings such as winding 409 may be connected directly to "OR" and "AND" circuits such as circuits 921 and 916. Also, the input 926 to the gate 929 may be connected directly to the shift pulse conductor 1116 (FIG. 11) thus eliminating the necessity for a relay such as 924 (FIG. 9) and a blocking oscillator such as 925.

Thus, when the particular assigned code is transferred into the respective stage of the shift register 1113, the "OR" circuit, the "AND" circuit, and the gate circuit (similar to circuits 921, 916 and 928) of the respective detecting circuit will cause the operation of a relay such as 929 of FIG. 9. When the relay such as 929 operates, it will energize the respective solenoid pusher such as 1111–1 to discharge the package 1105 from the conveyor belt 1101 to the respective conveyor such as 1112–1. In the event that a non-assigned code is shifted into a stage of the shift register 1113, the respective "OR" and "AND" circuits of the respective detecting circuit such as 1115–1 will reject the code and prevent the operation of the respective solenoid pusher. As mentioned above, erasure of a code subsequent to its detection by its corresponding discharge station detecting circuit is not necessary inasmuch as it is automatically erased incident to a shift pulse while it is stored in the last shift register stage 1114–n. The stage 1114–n has no output.

The routing of a package by the conveyor system disclosed in FIG. 11 will now be described in detail. An operator places a package on the belt 1101 and centers it longitudinally with respect to a line 1102. At the same time, he actuates the selector 1106 to select a predetermined discharge station for example, 1104–n.

The selector 1106 will selectively operate the code permutation contact assembly 1107 to prepare a circuit for producing permutated signals corresponding to the selected discharge station 1104-n. The package 1105 will move with the belt 1101 toward the first discharge station 1104-1. As the package 1105 reaches a predetermined position relative to the discharge station 1104-1, the wiper 1109 of the synchronizing switch 1108 will engage the contact 1110 to produce a shift pulse. When the shift pulse is produced by the synchronizing switch 1108, the routing code prepared in the code permutation contact assembly 1107 is shifted into the first stage 1114-1 of the shift register 1113.

The incoming signals to the shift register stage 1114-1 will be reproduced and fed to the detecting circuit 1115-1. The detecting circuit 1115-1 will reject the code and nothing further will happen until the package 1105 reaches the predetermined position adjacent the next succeeding discharge station 1104-2. At this time, the synchronizing switch 1108 will produce another shift pulse to shift the routing code for the package 1105 to the next succeeding shift register stage 1114-2.

The incoming code will be reproduced by the shift register stage 1114-2 and fed its respective detecting circuit 1115-2. The detecting circuit 1115-2 will reject the routing code for the package 1105.

This sequence of operations will be repeated as the package 1105 moves with the belt 1101 to succeeding discharge stations (not shown) until finally the package 1105 reaches the desired discharge station 1104-n. At this time, a shift pulse produced by the synchronizing switch 1108 will shift the routing code from the next preceding stage into the stage 1114-n. The stage 1114-n will reproduce the routing code and feed it to its respective detecting circuit 1115-n. The detecting circuit 1115-n will accept the routing code and operate its detecting relay such as relay 929 of FIG. 9. The detecting relay will operate the solenoid of the pusher 1111-n, and the pusher 1111-n will push the package 1105 from the belt 1101 to the conveyor 1112-n.

When the next succeeding shift pulse is produced by the synchronizing switch 1108, the routing code for the package 1105 is erased from the shift register stage 1114-n.

While there has been described what is at present believed to be the preferred embodiments of the invention, it will be understood that various changes and modifications may be made therein; and it is contemplated to cover in the appended claims all such changes and modifications as fall within the true spirit and scope of the invention.

What is claimed is:

1. A semi-automatic conveyor system of the type in which a prime mover drives an endless conveyor chain having a plurality of equally spaced load transporting carriers secured thereto for movement in a predetermined path, in which at least one load station and a plurality of discharge stations are adjacent the path, and in which a timer controlled by an operator at the load station operates to cause an object to be deposited in the first empty carrier approaching the load station after actuation of the timer and to be delivered to any discharge station selected by the operator, wherein the path is divided into a plurality of defined sections equal in length to the spacing between carriers and wherein the timer comprises: a multi-channel shift register having a plurality of stages equal in number to the path sections, each stage corresponding to a predetermined section of the carrier path; circuits controlled by an operator for causing a waiting object to be transferred from the load station to an empty carrier and to cause a code permutation assigned to a selected discharge station to be written into a stage of the shift register corresponding to the carrier path section adjacent which the load station is disposed; control circuits for shifting the assigned code permutation into succeeding stages of the shift register coincident with the movement of the object to succeeding carrier path sections, whereby the assigned code permutation is shifted into the carrier path section adjacent which the selected discharge station is disposed as the object reaches the section; circuits for detecting the presence of the assigned code permutation in the last mentioned shift register stage; and control circuits responsive to the detection of the assigned code permutation for causing the object to be removed from carrier at the selected discharge station.

2. The combination claimed in claim 1 together with a device operated in synchronism with the load transporting carriers for rendering the detecting circuits effective only when the carriers are in predetermined positions adjacent the respective stations.

3. A recycling semi-automatic conveyor system of the type in which a prime mover drives an endless conveyor chain having a plurality of equally spaced load transporting carriers secured thereto for movement in a predetermined path, in which at least one load station and a plurality of discharge stations are adjacent said path, and in which a timer controlled by an operator at the load station operates to cause an object to be deposited on the first empty carrier approaching the load station after actuation of the time and to be delivered to any discharge station selected by the operator, wherein the path is divided into a plurality of sections equal in number to the carriers and wherein the timer comprises: a stationary multi-channel shift register having a plurality of stages equal in number to the path sections, each stage corresponding to a predetermined section of the carrier path, control circuits individual to the load station for causing an object to be transferred from the load station to an empty carrier and to cause a code permutation assigned to a selector discharge station to be written into a stage of the shift register corresponding to that section of the carrier path adjacent which the load station is disposed, control circuits for shifting the assigned code permutation through successive stages of the shift register and into that stage of the shift register corresponding to the section of the conveyor path adjacent which the selected discharge station is disposed in synchronism with the movement of the object toward the selected discharge station; and control circuits individual to the selected discharge station for detecting the presence of the assigned code permutation in the respective shift register stage for causing the object to be removed from the carrier at said selected discharge station.

References Cited in the file of this patent

UNITED STATES PATENTS

| | | |
|---|---|---|
| 2,194,352 | Brixner | Mar. 19, 1940 |
| 2,683,819 | Rey | July 13, 1954 |
| 2,717,086 | Bush | Sept. 6, 1955 |
| 2,812,079 | Carnine | Nov. 5, 1957 |
| 2,900,497 | Vande Sande | Aug. 18, 1959 |
| 2,985,835 | Stuart | May 23, 1961 |

FOREIGN PATENTS

| | | |
|---|---|---|
| 203,271 | Australia | Feb. 2, 1955 |